United States Patent [19]

Urayama

[11] Patent Number: 4,697,702
[45] Date of Patent: Oct. 6, 1987

[54] MAGNETIC TAPE CASSETTE WITH TAPE PROTECTIVE SLIDING CLOSURE AND LOCK MECHANISM FOR SLIDING CLOSURE

[75] Inventor: Kiyoshi Urayama, Miyagi, Japan

[73] Assignee: Sony Corporation, Tokyo, Japan

[21] Appl. No.: 836,715

[22] Filed: Mar. 6, 1986

[30] Foreign Application Priority Data

Mar. 22, 1985 [JP] Japan ............................ 60-41310[U]

[51] Int. Cl.$^4$ ........................................... B65D 85/672
[52] U.S. Cl. .................................... 206/387; 206/389; 360/96.5; 242/199
[58] Field of Search ............... 206/387, 389; 360/96.5, 360/71, 105, 132; 242/199

[56] References Cited

U.S. PATENT DOCUMENTS

| | | | |
|---|---|---|---|
| 1,942,891 | 1/1934 | Wittel | 88/17 |
| 2,095,850 | 10/1937 | Wittel | 88/18.4 |
| 2,206,032 | 7/1940 | Foster | 88/17 |
| 2,500,661 | 3/1948 | Briskin et al. | 88/17 |
| 3,615,155 | 3/1969 | Gelbman | 242/188 |
| 3,628,955 | 12/1971 | Haist et al. | 96/91 |
| 3,705,699 | 12/1972 | Siller | 242/199 |
| 3,962,727 | 6/1976 | Gamimura et al. | 360/85 |
| 4,032,987 | 6/1977 | Singer et al. | 360/132 |
| 4,045,821 | 8/1977 | Fujikura | 360/132 |
| 4,091,425 | 5/1978 | Umeda | 360/74 |
| 4,208,681 | 6/1980 | Hatchett | 360/97 |
| 4,320,424 | 3/1982 | Murayama | 360/96.5 |
| 4,343,024 | 8/1982 | Kawai | 360/74.6 |
| 4,363,059 | 12/1982 | Matsuzawa et al. | 360/132 |
| 4,402,024 | 8/1983 | Kato | 360/96.5 |
| 4,449,677 | 5/1984 | Ohta et al. | 242/199 |
| 4,498,112 | 2/1985 | Georgens et al. | 360/96.5 |
| 4,524,926 | 6/1985 | Nemoto et al. | 242/198 |
| 4,527,755 | 7/1985 | Rood et al. | 242/199 |
| 4,561,031 | 12/1985 | Tanabe | 360/96.5 |
| 4,568,990 | 2/1986 | Ueno et al. | 360/96.5 |
| 4,572,461 | 2/1986 | Horikawa et al. | 242/198 |

FOREIGN PATENT DOCUMENTS

| | | |
|---|---|---|
| 0135195 | 3/1985 | European Pat. Off. . |
| 0160822 | 3/1985 | European Pat. Off. . |
| 0159591 | 4/1985 | European Pat. Off. . |
| 0144802 | 11/1985 | European Pat. Off. . |
| 2145999 | 4/1985 | United Kingdom . |
| 2152009 | 7/1985 | United Kingdom . |
| 2150916 | 7/1985 | United Kingdom . |
| 2155905 | 10/1985 | United Kingdom . |
| 2157265 | 10/1985 | United Kingdom . |

*Primary Examiner*—Joseph Man-Fu Moy
*Attorney, Agent, or Firm*—Vorys, Sater, Seymour and Pease

[57] ABSTRACT

A magnetic tape cassette is provided with a pivotal closure lid pivotably secured to opposite edges of a casing for movement between a closed position, in which the front opening of the casing through which a magnetic tape can be extracted for loading onto a rotary head while not in use, and an open position wherein the closure lid is pivoted away from said opening to allow access to the tape while in use, is also provided with a sliding closure member slidably mounted on one face of the casing and cooperative with the aforementioned pivotal closure lid, which sliding closure member is held either in a closed position while the pivotal closure lid is in its closed position to cover a bottom spacing through while a device constituting part of a tape handling mechanism may be inserted, or an open position while the pivotal closure lid is in its open position to allow the aforementioned device of the tape handling mechanism to engage the casing through the bottom spacing for extracting the tape for loading onto the rotary head, and is retained at least in the closed by means of a locking mechanism. The locking mechanism comprises a pair of locking members provided adjacent both lateral sides of the magnetic tape cassette and are associated with the cassette casing. The pair of locking members are adapted to resiliently establish locking engagement with the sliding closure member at locations adjacent both lateral sides of the magnetic tape cassette.

16 Claims, 13 Drawing Figures

MAGNETIC TAPE CASSETTE WITH TAPE PROTECTIVE SLIDING CLOSURE AND LOCK MECHANISM FOR SLIDING CLOSURE

BACKGROUND OF THE INVENTION

The present invention relates generally to a magnetic tape cassette, such as a cassette specifically adapted for pulse-code modulated (PCM) recording and/or reproduction. More specifically, the invention relates to a tape protective structure for a magnetic tape cassette for protecting a magnetic tape when the magnetic tape cassette is not in use.

In recent years, various recording and/or reproducing apparatus have been developed which convert analog signals, such as audio signals and the like into digital signals, e.g. PCM signals, which are then recorded on and reproduced from magnetic tape serving as a recording medium. Some of these apparatus employ rotary heads in order to achieve a relatively high recording density. Recording and/or reproducing apparatus specifically designed to record and reproduce PCM signals and employing a rotary head will be referred to as "PCM recorders" throughout the disclosure. A PCM recorder, at first, pulls a loop of magnetic tape out through a front opening of the cassette and winds the tape around a rotary drum accommodating the rotary head and then the recording and reproducing is performed. In such digital recording and reproducing systems, oily deposits, such as fingerprints or the like, and/or dust adhering to the tape surface may cause dropout of reproduced signals.

Various approaches have been tried to protect the magnetic recording medium. For example, the European Patent First Publication No. 01 60 822, published Nov. 13, 1985, and the British Patent First Publication No. 2,155,905, published Oct. 2, 1985, which respectively disclose prior inventions commonly owned by the owner of the present invention, disclose magnetic tape cassettes which respectively have closure lids for retractably covering the front end openings of the cassettes, through which the tape is extracted for access by rotary heads. Each such closure lid is held closed while the tape is not in use and is moved to an open position when the cassette is inserted into the PCM recorder. In this earlier approach, a drawback may be encountered when the closure lid is unintentionally or accidentally opened, exposing the tape to oily fingerprints, dust and so forth while it is not in use. A locking mechanism which can conveniently lock the closure lid in its open and closed positions could resolve this problem.

The magnetic tape cassette disclosed in the aforementioned the European Patent First Publication No. 01 60 822 and the British Patent First Publication No. 2,155,905 also has a sliding closure for closing a lower openings which allow entry of a loading device and tape reel drive of the recording and reproducing apparatus. The sliding closure may also be movable between open and closed positions. The sliding closure may be associated with a lock mechanism for locking the sliding closure at least in its closed position. The lock mechanism may be released by a mechanism or device provided in the recording and/or reproducing apparatus for releasing the locking mechanism from a locking position so that the closure may move between open and closed positions.

The present invention is directed to an improvement in the prior proposed sliding closure locking mechanism for magnetic tape cassettes of the type disclosed in the European Patent First Publication 01 60 822 and the British Patent First Publication No. 2,155,905.

SUMMARY OF THE INVENTION

It is an object of the present invention to provide a lock mechanism or a device which can effectively lock the sliding closure and steadily hold the sliding closure in the closed position when the magnetic tape cassette is not in use.

In order to accomplish the above-mentioned and other objects, a magnetic tape cassette, according to the present invention, is provided with a pivotal closure lid pivotably secured to opposite edges of a casing for movement between a closed position, in which the front opening of the casing through which a magnetic tape can be extracted for loading onto a rotary head while not in use is covered, and an open position wherein the closure lid is pivoted away from said opening to allow access to the tape while in use, and is also provided with a sliding closure member slidably mounted on one face of the casing and cooperative with the aforementioned pivotal closure lid, which sliding closure member is held either in a closed position while the pivotal closure lid is in its closed position to cover a bottom spacing through which a device constituting part of a tape handing mechanism may be inserted, or an open position while the pivotal closure lid is in its open position to allow the aforementioned device of the tape handling mechanism to engage the casing through the bottom spacing for extracting the tape for loading onto the rotary head, and is retained at least in the closed position by means of a locking mechanism. The locking mechanism comprises a pair of locking members provided adjacent both lateral sides of the magnetic tape cassette and are associated with the cassette casing. The pair of locking members are adapted to resiliently establish locking engagement with the sliding closure member at locations adjacent both lateral sides of the magnetic tape cassette.

In the preferred embodiment of the magnetic tape cassette, each of the locking members comprises a resilient arm integrally extending from the bottom of the cassette casing and a locking head formed integrally with the free end of the resilient arm.

By providing locking members adjacent both lateral sides, the sliding closure member can be steadily held in the closed position to firmly enclose the bottom.

According to one aspect of the invention. a magnetic tape cassette comprises a cassette casing having a mouth through which a magnetic tape is accessible, the mouth including a first opening in a front end face of the casing and a second opening in a lower section of the casing adjacent the front end face, a pivotal closure lid covering and exposing the first opening of the mouth, a sliding closure member slidable with respect to the lower section of the cassette casing and adapted to cover and expose the second opening of the mouth, the closure member being movable between a first position in which it covers the second opening and a second position in which it exposes the second opening; and a pair of first and second resilient locking means provided with the cassette casing and each having a resiliently deformable lever with a locking head, the first locking means being located adjacent a longitudinal front end and adjacent one of the lateral sides of the magnetic tape cassette and the second locking means being located adjacent the front end and adjacent the other lateral side of the magnetic tape cassette, the locking lever being associated with the sliding closure member for normally holding the closure member in the first position while the cassette is not in use, and allowing the closure member to move to the second position when the cassette is inserted into an associated recording and/or reproducing apparatus.

The closure member is provided with first and second means engagingly receiving the locking head of the locking lever at the first and second positions of the closure. The closure member is formed with a pair of first and second grooves longitudinally extending in a substantially parallel relationship to each other, into each of which the locking head protrudes through one of the first and second locking head receiving means.

The first and second receiving means are vacancies defined in the closure member for allowing the locking head to pass therethrough. The first receiving means comprises a pair of first and second through openings formed through the sliding closure member and arranged in alignment in parallel to the longitudinal axis of the magnetic tape cassette, the first through opening being engageable to a corresponding one of the locking heads of the locking lever of the first locking means at the first position of the sliding closure member and the second through opening being engageable to the corresponding one of the locking heads of the locking lever of the first locking means at the second position of the sliding closure member. The second receiving means comprises a pair of third and fourth through openings formed through the sliding closure member and arranged in alignment in parallel to the longitudinal axis of the magnetic tape cassette, the third through opening being engageable to one of the locking head of the locking lever of the second locking means at the first position of the sliding closure member and the fourth through opening being engageable to the corresponding one of the locking heads of the locking lever of the second locking means at the second position of the sliding closure member.

The first groove is located at a position corresponding to the first receiving means so that the lower ends of the first and second through openings open thereto. The first groove is also located at a position coresponding to the second receiving means so that the lower ends of the third and fourth through openings open thereto.

The first and second locking means are provided in the magnetic tape cassette in substantially symnmetrical position with respect to the longitudinal axis of the magnetic tape cassette.

The depth of the first and second grooves at least matches the corresponding dimension of the locking head protruding from the closure member.

A magnetic tape cassette comprises a cassette casing having a mouth through which a magnetic tape is accessible, the mouth including a first opening in a front end face of the casing and a second opening in a lower section of the casing adjacent the front end face, and a pair of reel shaft apertures through which driving hubs of tape reels are accessible, a pivotal closure lid for covering and exposing the first opening of the mouth, a sliding closure member freely slideable in the front-to-rear direction between first and second sliding positions, the reel shaft apertures and the second opening being exposed in the first sliding position and the reef shaft apertures and the second opening being covered by the closure member in the second sliding position, the sliding closure member cooperating with the pivotal closure lid in the second sliding position in such a manner that the closure member prevents the pivotal closure lid from exposing the first opening, and the sliding closure member being formed with a plurality of pairs of voids, each pair of voids being arranged in alignment on a line substantially in parallel to the longitudinal axis of the magnetic tape cassette, and a plurality of resilient locking levers with locking heads provided in the cassette casing and respectively having heads engageable with a corresponding one of the voids for holding the sliding closure member at one of the first and second sliding positions, each of the locking levers being located at a position corresponding to one set of the voids to engage the locking head thereof to one of the voids of the corresponding pair according to the sliding closure position.

Each pair includes first and second voids to which the locking head of the corresponding locking lever engages, the locking head engaging the first void for holding the sliding closure member at the first sliding position while the cassette is not in use, and allowing the second void to hold the closure member at the second position when the cassette is inserted into an associated recording and/or reproducing apparatus. The closure member is formed with a plurality of grooves at the positions respectively corresponding to the positions of the corresponding pair of voids, which grooves receive the locking head of the corresponding locking lever passing through one of the voids.

The magnetic tape cassette further comprises a guide means associated with the casing and the closure member for guiding sliding movement of the closure member between the first and second positions. The guide means comprises a guide groove formed in one of the casing and the shutter member and a projection protruding from the other of the cassette casing and the closure.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment illustrated but are for explanation and understanding only.

In the drawings:

FIGS. 5 and 6 are enlarged sections taken along line A—A of FIG. 3, in which FIG. 5 shows the magnetic tape cassette position where the sliding closure member is held in the closed position , and in which FIG. 6 shows the magnetic tape cassette position where the sliding closure is held in the open position;

DESCRIPTION OF THE PREFERRED EMBODIMENT

Figure 3:
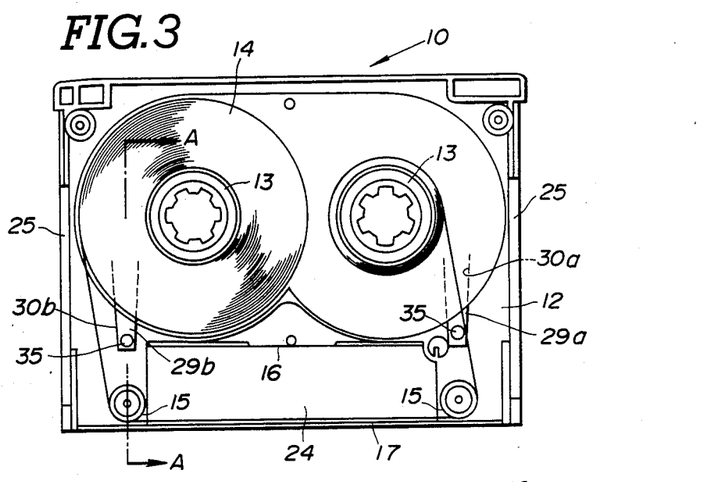
FIG. 3 is a fragmentary plan view of the preferred embodiment of a magnetic tape cassette of Fig. 1, in which an upper half of a cassette casing is removed in order to show the inside of the cassette casing.
Figure 4:
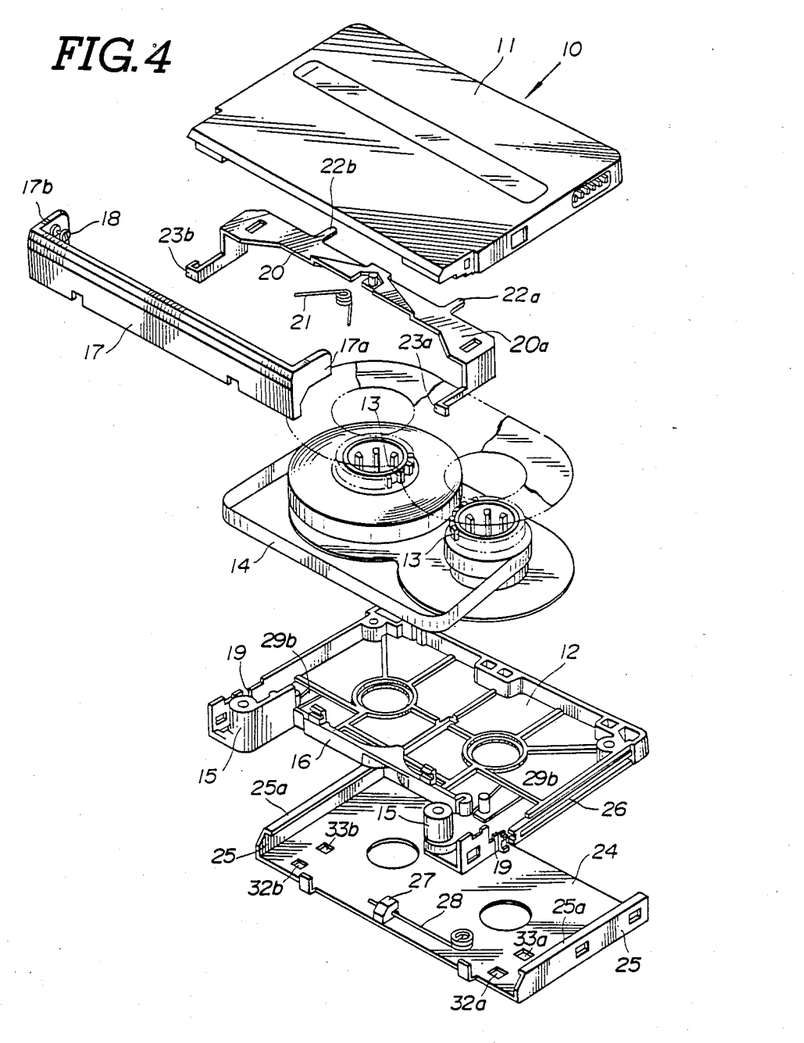
FIG. 4 is an exploded perspective view of the magnetic tape cassette of FIG. 1.
Figures 5, 6:
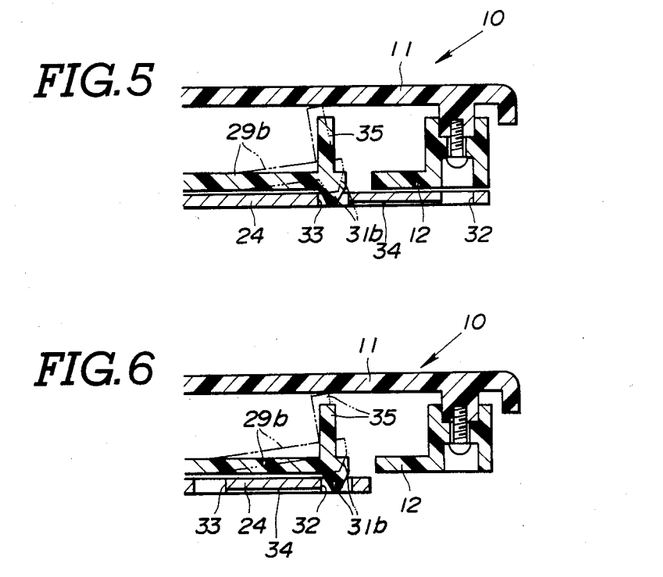

Referring now to the drawings, particularly to FIGS. 1 to 4, a magnetic tape cassette generally comprises a cassette casing 10 including an upper half 11 and a lower half 12 which are connected by threaded bolts, best seen in FIGS. 5 and 6, in a per se well-known manner to form a single unit. A transparent window plate 11a is built into the upper surface of the upper half 11. A pair of reel hubs 13 are rotatably incorporated into the cassette casing 10. The pair of reel hubs 13 respectively engage corresponding one of a pair of reel shaft insertion apertures. The reel shaft insertion apertures are formed in the lower half 12 at predetermined positions which establish a suitable spacing between the reel hubs 13. A magnetic tape 14 is wound around the reel hubs 13.

Figure 2:
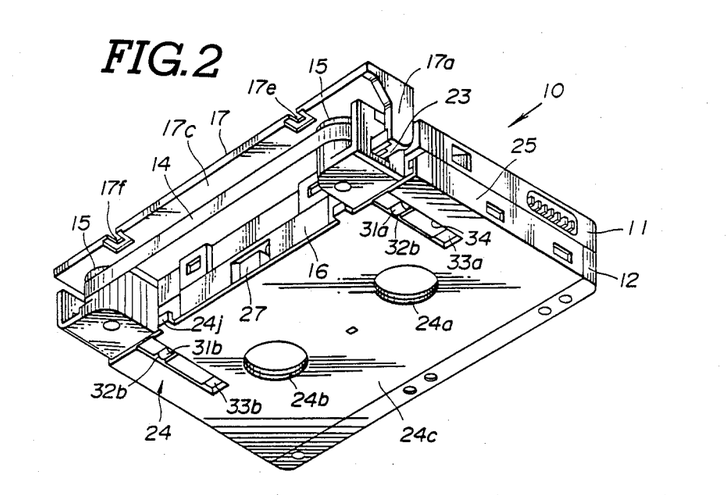
FIG. 2 is a perspective view of the magnetic tape cassette of FIG. 1, viewed from below the cassette, in which the pivotal closure lid and the sliding closure member are in their respective open position during use of the cassette.

A pivotal closure lid 17 is rotatably or pivotally attached at the right and left side walls of the cassette casing near the front end of the tape cassette. When the pivotal closure lid 17 is pivoted away from the front surface of the tape cassette, the magnetic tape 14 is exposed, as shown in FIG. 2. An essentially rectangular cut-out 16 is formed in the front end of the lower half 12. When the magnetic tape cassette is inserted into a PCM recorder which will be briefly discussed later, a tape guide system or a device constituting part of a tape retaining mechanism (not shown) is inserted into the cut-out portion 16 and pulls out some of the tape 14 for loading onto a rotary head of the PCM recorder. A sliding closure member 24 engages the lower half 12 and covers and exposes the cut-out portion 16 as it slides back and forth.

Figure 1:
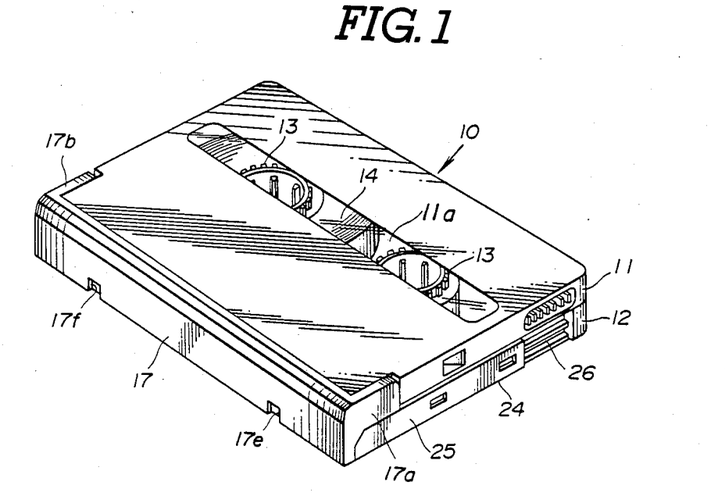
FIG. 1 is a perspective view of the preferred embodiment of a magnetic tape cassette according to the present invention, in which a pivotal closure lid and a sliding closure member are in their respective closed positions.

While the tape cassette is not in use, the pivotal closure lid 17 is located opposite a front opening formed in the front surface of the cassette casing 10 to cover the latter. At the same time, the sliding closure 24 is in its forwardly-shifted position in which it covers the cut-out portion 16 of the lower half 12 and thus prevents the tape guide system from reaching into the tape cassette for extracting the tape, as shown in FIG. 1. The closure lid 17 can pivot away from the front surface of the cassette to expose the magnetic tape 14, and, at the same time, the sliding closure member 24 can move to the rear to expose the cut-out portion 16 so that the tape guide system can reach into the cut-out portion 16 to draw some of the magnetic tape 14 out of the cassette casing 10 for loading onto a rotary drum for recording and/or playback. Thereafter, when the recording and/or playback is complete and the tape cassette is returned to a stand-by state, the pivotal closure lid 17 and the sliding closure member 24 are returned to the aforementioned closed positions. Throughout the rest of this document, the positions of the pivotal closure lid 17 and the sliding closure member 24 in which each covers the front opening and the cut-out portion 16 respectively will be referred to as a "closed position" and the position of the pivotal closure lid 17 and the sliding closure member 24 in which each exposes the front opening and the cut-out portion 16 will be referred to as an "open position".

The cassette casing 10 also has a pair of tape guide columns 15 integrally formed to the left and right sides of the front edge of the lower section 3, as shown in FIG. 3. The magnetic tape 14 is stretched between and around the tape guide columns 15 so as to follow a predetermined tape run or path along the front edge of the tape cassette and across the front opening over the rotary head.

The cut-out portion 16 of the lower half 12 extends over a predetermined width so as to expose the rear surface of the magnetic tape 14 stretched between the tape guide columns 15. During recording and/or reproduction, a device constituting part of the tape handling system or the tape guide system projects into the cut-out portion 16 and draws out a section of the magnetic tape 14. The tape handling system is part of the PCM recorder.

The pivotal closure lid 17 is elongated along the major dimension of the front opening and has arms 17a, 17b projecting from its opposite ends which pivotably attach the pivotal closure lid 17 to the front of the cassette casing 10 by means of pivot shafts (not shown). Thus, the pivotal closure lid 17 can be pivoted to selectively cover and expose the front opening of the cassette casing 10. The closure lid 17 also comprises a plate 17c which is elongated in the direction of the opening in the cassette casing 10 and covers the entire length of the front of the cassette casing 10. When the closure lid 17 is pivoted to the closed position to cover the front of the cassette casing 10, the arms 17a and 17b lie flush with the contours of the upper half 11 as best shown in FIG. 1. When the closure lid 17 is in this position, the sliding closure member 24 is held in its forward position under the arms 17a and 17b as shown in FIG. 1 by means of a locking mechanism which will be described later. The rotary shafts about which the lid 17 pivots are approximately centered on the inner surfaces of the respective arms 17a and 17b. Cut-away portions 17e, 17f are formed by cutting small grooves into the lower edge of the plate 17c toward the left and right extremes of the cut-out portion 16 of the lower half 12 of the cassette casing 10.

The sliding closure mebmer 24 has a flattened U-shaped configuration and is so mounted on the lower half 12 of the cassette casing 10 that it can slide back and forth parallel to the lower surface of the lower cassette half 12. Apparatus 24a and 24b respectively corresponding to the reel shaft insertion apertures are formed in the sliding closure member 24 in such positions that after the sliding closure member 24 slides all the way backwards to expose the cut-out portion 16, the apertures 24a and 24b are respectively aligned with the reel shaft insertion apertures of the lower half 12 of the cassette casing 10.

The sliding closure member 24 comprises a flat plate 24c which lies parallel to the lower surface of the lower half 12 and side plates 25 along the left and right sides of the flat plate 24c which lie parallel to the outer surfaces of the left and right side walls of the lower half 12. As shown in FIG. 4, flanges 25a are formed by bending the upper ends of the side plates 25 inwardly. The flanges 25a engages guide grooves 26 formed between the upper and lower halves 11 and 12 on the both side walls of the cassette casing 10 and extend therealong. The flanges 25a are restrained vertically but not horizontally between the side walls of the upper and lower halves 11 and 12 after the cassette casing 10 is assembled.

Contact pieces 24i and 24j extend upwards perpendicularly from the flat plate 24c at the front of the plate at positions which correspond to the cut-away portions 17e and 17f of the closure lid 17. The contact pieces 24i and 24j enable the recording-reproducing apparatus to slide the sliding closure member 24 to the rear in preparation for opening the cassette casing 10 in a manner described later.

A hook 27 is formed on the front edge of the flat plate 24c. The hook 27 is centered between the contact pieces 24i and 24j. One leg 28a of a torsion spring 28, the coil of which is housed in the front portion of the lower half 12, engages the hook 27. The torsion spring exerts a forward biasing force on the sliding closure member 24. When the sliding closure member 24 is in its open position, as shown in FIG. 2, the torsion spring 28 is stressed and exerts a counteracting force biasing the sliding closure member 24 toward its closed position.

The sliding closure member 24 is also formed with openings 32a, 32b and 33a, 33b. The openings 32a and 32b are located near the front edge of the sliding closure member 24. The opening 33a and 33b are in longitudinal alignment with respectively corresponding openings 32a and 32b and spaced apart from the latter at a predetermined distance. On the other hand, the openings 32a and 33a constitutes a pair lying parallel to and near one side edge of the flat plate 24c, and the openings 32b and 33b constitute a pair near the other side edge of the flat plate. As will be seen from Fig. 4, the pairs of openings 32a, 33a and 32b, 33b are located laterally to the outside of the contact pieces 24i and 24j. A pair of thin grooves 34a and 34b are formed on the lower surface of the sliding closure member 24 in the regions where the openings 32a, 33a and 32b and 33b are formed. Preferably, the grooves 34a and 34b have a tapered end opening onto the front edge of the sliding closure member 24. The openings 32a, 33a and 32b, 33b are respectively so arranged as to engage locking projections or heads 31a and 31b of a pair of locking levers 29a and 29b which are integrally formed with the lower half 12. As will be appreciated, the locking levers 29a and 29b have resilient lever sections which are thinner than the rest of the lower section for added flexibility. The locking heads 31a and 31b project downwards from the free end of the locking levers 29a and 29b. Along both sides of the locking levers 29a and 29b, elongated slots separate the locking levers 29a and 29b from the lower half 12. This enhances the flexibility of the locking levers 29a and 29b for free movement of their free ends.

The locking heads 31a and 31b have rounded tops which extends downwards through respectively corresponding openings 32a, 33a and 32b, 33b. The height H of each of the locking heads 31a and 31b is selected so that the round tops of the heads 31a and 31b can lie flush with the lower surface of the sliding closure member, within the grooves 34a and 34b and so that the tops of the heads can rest atop the lower surface of the sliding closure member 24.

Positioning holes 10a and 10b are formed through the bottom of the lower half 12 directly under the tape guide columns 15 respectively.

The locking levers 29a and 29b also have limiter projections 35 projecting upwardly from the upper surface thereof. The limiter projections 35 limit upward deformation of the locking levers 29a and 29b.

The magnetic tape cassette is also provided with a reel brake member 20 comprises a slide guide plate 20a which is elongated in a direction parallel to the front opening of the casing and to the pivotal closure lid 17 and lies along the inner surface of the upper half 11. The reel brake member 20 also comprises L-shaped arms 23a and 23b which respectively extend perpendicularly downward from either end of the slide guide plate 20a and then forward. Brake pins 22a and 22b corresponding to the reel hubs 13 respectively extend rearward from the slide guide plate 20a. Brake wheels are formed on the outer peripheral portions of the reel hubs 13 opposite the brake pins 22a and 22b.

A spring-engaging stud 20f is provided at the center of the slide guide plate 20a, and operating tabs are formed on the extreme ends of the arms 23a and 23b respectively. The center coil of a torsion spring 21 used to bias the reel brake member 20 towards its braking position is fitted onto the spring-engaging stud 20f. The free ends of the spring 21 press against the rear of the shield wall of the upper section 11 so that the brake pins 22a and 22b normally engage the brake wheels of the reel hubs 13, whereby the reel hubs 13 are prevented from rotating.

The reel brake member 20 is so disposed within the cassette casing 10 that the ends of the tabs protrude through the insertion apertures of the lower half 12 outside of the support walls to a predetermined extent. When the pivotal closure lid 17 is pivoted upwards, the protruding tabs are engaged by the ends of the arms 17a and 17b of the pivotal closure lid 17, and the reel brake member 20 is pulled forward against the biasing force of the spring 21. The brake pins 22a and 22b are thus disengaged from the brake wheels of the reel hubs 13, allowing the reel hubs 13 to rotate.

In the shown construction, when the tape cassette is not in use, the closure lid 17 is in its closed position shown in FIG. 1 to cover the front opening. At the same time, the sliding closure member 24 is in its closed position as shown in FIG. 1, thus covering the cut-out 16. In this case, the locking heads 31a and 31b of the locking levers 29a and 29b are in engagement with respectively corresponding openings 32a and 32b as shown in FIGS. 1 and 5. As will be apparent from FIG. 5, the locking heads 31a and 31b of the locking levers 29a and 29b lie fully within the grooves 34a and 34b so that the tops do not protrude downwards from the lower surface of the sliding closure member 24. While FIGS. 5 and 6 show certain elements of a pair of like elements specifically, it will be understood that the other of the pair is similarly constructed.

Figure 7:
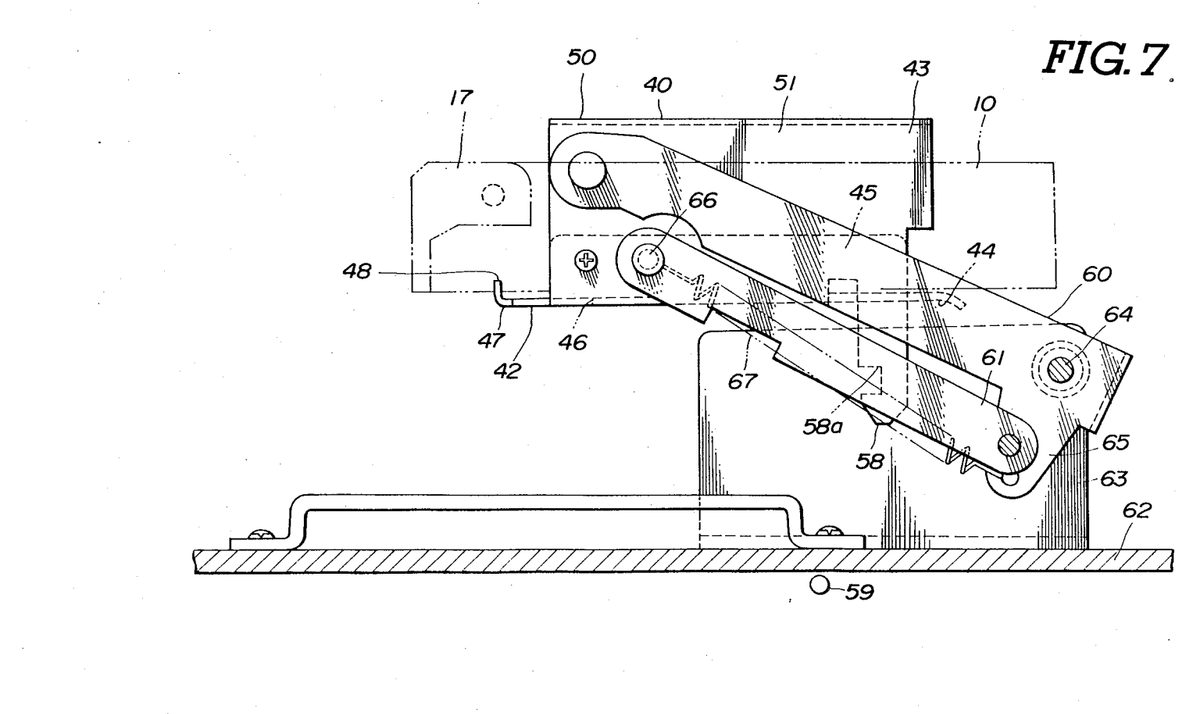
FIG. 7 is a side elevation of the preferred embodiment of a cassette holder in a recording and reproducing apparatus for the preferred embodiment of the magnetic tape cassette, according to the invention.
Figure 8:
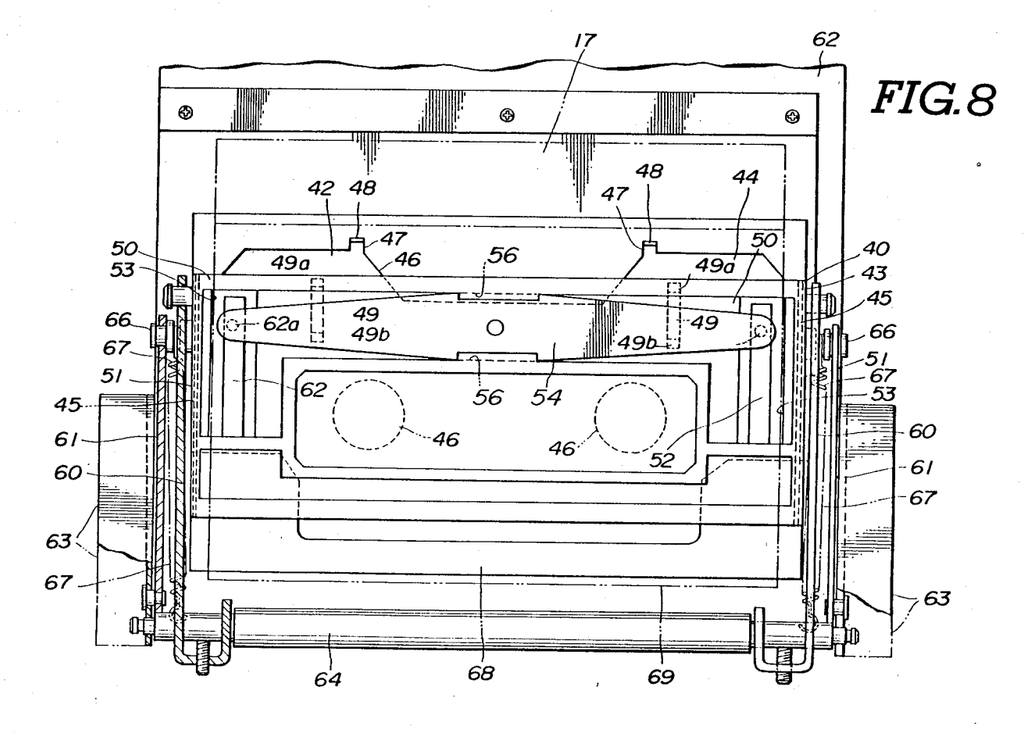
FIG. 8 is a plan view of the cassette holder of FIG. 7.
Figure 9:
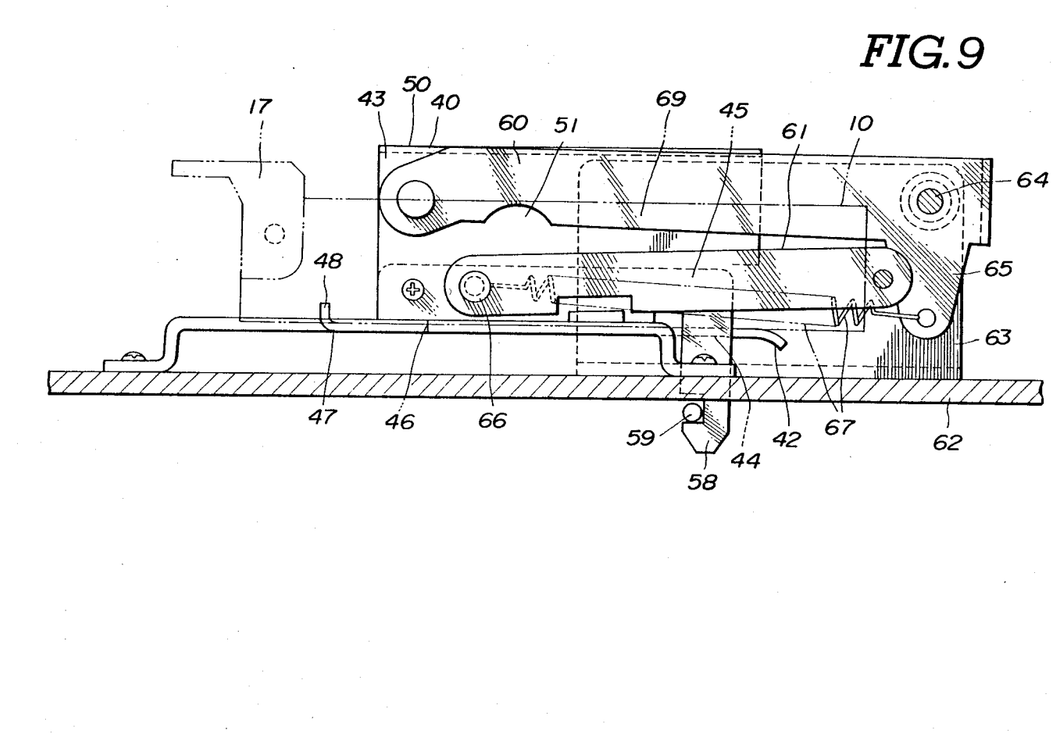
FIG. 9 is a side elevation of the cassette holder of FIG. 7, but showing the magnetic tape cassette upon completion of loading.

When the tape cassette is to be used in a PCM recorder, the cassette is first inserted into the preferred embodiment of a cassette holder 40 which is shown in FIGS. 7 to 9.

FIGS. 7 to 9 shows the preferred embodiment of a cassette holder 40 of the present invention to be installed in a recording and/or reproducing apparatus and adapted for handling the magnetic tape cassette as disclosed hereabove. The cassette holder 40 generally comprises a lower holder 42 and an upper holder 43. The lower holder 43 is made from a metal plate and has a bottom plate 44 and a pair of side walls 45 extending vertically from the edges of the bottom plate. The bottom plate 44 has a front edge with a cut-out 46 near or at its center. The cut-out 46 is narrower at its outer ends than near its center. The bottom plate 44 is also formed with circular openings 46' for receiving reel shafts (not shown) of a PCM audio player system. A pair of projections 47 project from the front edge of the bottom plate, i.e. from the front edge of the cut-out 46. The projections 47 have upwardly bent front ends which form upwardly extending claws 48. The bottom plate 44 also has elongated upward projections 49 near its front edge and transversely offset from the center of the cassette holder. The projections 49 lie parallel to the longitudinal axis of the cassette holder. The projections 49 have tapered front and rear ends 49a and 49b.

It should be noted that, in the shown embodiment, the projections 49 may be integral with the bottom plate 44 and formed by pressing. Alternatively, the projections 49 can be formed separately from the bottom plate 44 and thereafter attached to the bottom plate.

The upper holder 43 is made of a synthetic resin and has a ceiling plate 50 and a pair of descending side walls 51 extending from its transverse edges. The side walls 51 are fixed to the side walls 45 of the lower holder 42 to form an opened box-shaped cassette receptacle open at its front and rear ends.

The upper holder 43 has depression members 52 extending longitudinally along the transverse edges of the ceiling plate 50. In the shown embodiment, the depression members 52 are formed integrally with the upper holder 43 and are connected to the major section of the ceiling plate 50 at their rear ends. As best shown in FIG. 8, the ceiling plate 50 has cut-outs 53 surrounding the depression members 52. Each depression member 52 has a section 52a extending into the interior of the cassette holder 40 and a second section 52b extending upward from the upper plane of the ceiling plate 50. The section 52b of the depression member 52 is in contact with a leaf spring 54 which rests on the upper plane of the ceiling plate 50 and has is wider at its center than at its longitudinal ends. The width of the leaf spring 54 gradually tapers towards its ends. A through opening 55 at the center of the leaf spring 54 engages a projection 57 extending upward from the upper plane of the ceiling plate 50.

The ceiling plate 50 has a pair of longitudinally spaced grooves 56 on its upper surface near its front edge. The grooves 56 are intended to receive the front and rear edges of the central portion of the leaf spring 54, as shown in FIG. 8. The grooves 56 cooperate with the projection 57 to fix the leaf spring 54 to the upper surface of the ceiling plate 50. The leaf spring 54 normally biases the depression member 52 downwards. With this arrangement, when the magnetic tape cassette is inserted into the internal space of the cassette holder 40, the cassette is depressed downward toward the lower holder 42 by by the leaf spring 54 and the depression member 52.

As shown in FIGS. 7 and 9, the lower holder 43 has a lever 58 extending downward therefrom. A recess 58a is formed in the front vertical face of the lever 58. When the cassette holder 40 is lowered into the recording and reproduction apparatus, the lever 58 passes through an aperture in a mechanical chassis 62 and the recess 58a engages an eject-lock pin 59, which will be discussed again later.

The cassette holder 40 is supported by a mechanical chassis 62 of the PCM audio player system by means of pivotable arms 60 and 61. The pivotable arms 60 and 61 move the cassette holder 40 up and down with respect to the mechanical chassis 62. Although it has not been illustrated in the drawings, various PCM audio player mechanisms, such as a pair of reel shafts, a tape-loading mechanism, a tape-drive system and so forth are mounted on the mechanical chassis 62.

A pair of supporting strips 63 extend upward from the mechanical chassis 62. The upper pivotable arms 60 are pivotably supported by the supporting strips 63 by means of a pivot shaft 64 which is rotatable with respect to the supporting strip 63. Each upper pivotable arm 60 has a transverse extension 65 on its lower edge near the end connected to the supporting strip 63. The pivotable arms 60 also have front ends connected to the front ends of the side walls 51 of the cassette holder 40. The front ends of the pivotable arms 60 are pivotably fastened to the side walls 51 of the cassette holder 40.

The lower pivotal arms 61 are shorter than the upper pivotal arms 60. The lower pivotal arms 61 are also pivotally connected to the supporting strip 63. The pivot axes of the lower pivotal arms 61 are below the pivot axes of the pivot shafts 64 of the upper pivoptal arms 60 and slightly forward of the pivotal shafts 64. The front ends of the lower pivotal arms 61 are pivotally connected to the side walls 51 of the lower holder 42 through pivot pins 66. The pivot axes of the pivot pins 66 are disposed below and rearward of the pivot axes about which the upper pivotal arms 60 pivot relative to the side walls 51.

Tension springs 67 are stretched between the lower end of the extensions 65 and the pivot pins 66. As will be appreciated from FIGS. 7 and 9, the distance between the lower end of the extensions 65 and the pivot pins 66 decreases when the cassette holder 40 moves away from the mechanical chassis 62 and increases when the cassette holder 40 approaches the mechanical chassis. Therefore, when the cassette holder 40 rests on the mechanical chassis 62, the tension of the tension spring 67 is at its greatest and thus it biases the upper arms 60 to pivot its front end upward. Therefore, unless a locking engagement is established by a locking mechanism for the cassette holder, which will be explained later, the cassette holder 40 will be held at the upper position shown in FIG. 7 where it allows insertion of the magnetic tape cassette.

In the condition of the cassette holder shown in FIG. 7, the magnetic tape cassette is inserted into the cassette holder 40. The force exerted through the magnetic tape cassette pivots the pivotal arms 60 and 61 counterclockwise as viewed in FIG. 7 to lower the cassette holder 40 toward the mechanical chassis 62. During this lowering motion of the cassette holder 40, the reel shafts, tape guide mechanism, the tape drive mechanism and so forth pass through the bottom plate 44 of the cassette holder to place the magnetic tape cassette in a loading condition. At the lowermost position in which the cassette holder 40 rests on the mechanical chassis, the recess 58a of the lever 58 of the cassette holder 40 comes into engagement with a locking pin 59 to establish locking engagement in order to hold the cassette holder in place.

Figure 10:
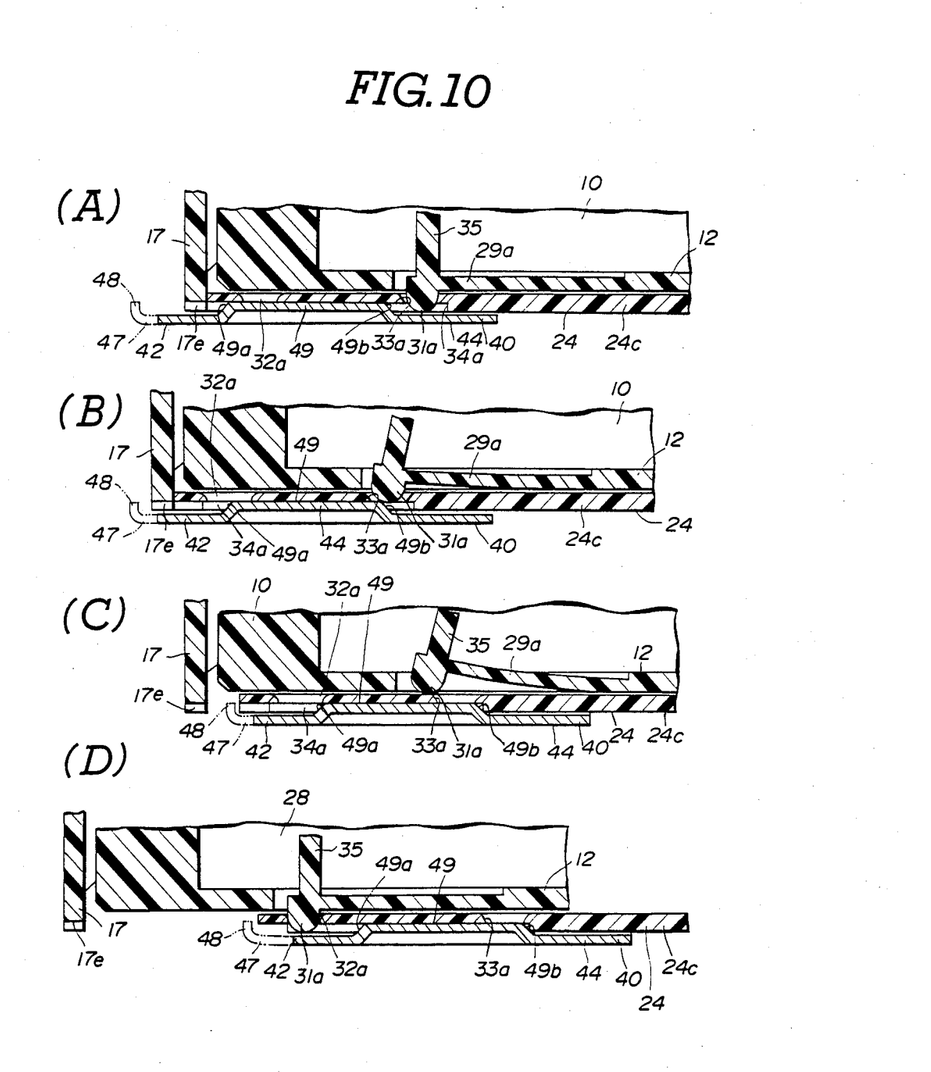
FIGS. 10(A) to 10(D) are partial sections of the magnetic tape cassette and the cassette holder, showing the loading process as a sequence of loading positions.

During insertion of the magnetic tape cassette into the cassette holder, the tapered rear ends 49b of the projections 49 projecting from the lower holder 42 enter respectively corresponding the grooves 34a and 34b of the sliding closure member 24, as shown in FIG. 10(A). Throughout FIG. 10, only one of a corresponding pair of elements is specifically shown, but it will be understood that pairs of such elements are substantially identical. Further frontward movement of the magnetic tape cassette brings the rear ends 49b of the projections 49 into contact with the locking heads 31a and 31b of the locking levers 29a and 29b, as shown in FIG. 10(B). As a result, the locking heads 31a and 31b are urged upwards and held there by contact with the top surface of the projection 49. While the locking heads 31a and 31b are held upward, the claws 48 of the projections 47 pass through the cut-outs 17e and 17f in the lower edge of the closure lid 17 and engage the contact pieces 24i and 24j on the front edge of the sliding closure member 24. This exerts a force acting against the force inserting the magnetic tape cassette into the cassette holder 40 on the sliding closure member 24 so as to bias the latter rearwards. This rearward counter force shifts the locking heads 31a and 31b of the locking levers 29a and 29b upwards along the tapered edges of the openings 33a and 33b as shown in FIG. 10(C). This releases the locking engagement between the locking heads 31a and 31b and the openings 33a and 33b of the sliding closure member 24, and so allows rearward movement of the sliding closure member 24. After slight rearward movement of the sliding closure member 24, the locking heads 31a and 31b come into contact with the upper surface of the sliding closure member 24 and thereafter are held in the upper, unlocked position. Therefore, the sliding closure member 24 is free to move rearward against the biasing force exerted by the torsion spring 28.

When the magnetic tape cassette is fully inserted into the cassette holder 40 and thus reaches the set position, the sliding closure member 24 will be in its predetermined rearmost position, wherein the apertures 24a are in alignment with the reel shaft insertion apertures in the lower half 12 and the cut-out 16 is exposed to accept the tape guide system and/or the tape retaining mechanism. In this position, the locking heads 31a and 31b of the locking levers 29a and 29b oppose the openings 32a and 32b of the sliding closure member 24. The resilient force exerted by the deformed locking levers 29a and 29b drives the locking heads 31a and 31b downward into engagement with the openings 32a and 32b. Thus, locking engagement retaining the sliding closure member 24 in its rearmost position is established.

When the sliding closure member 24 is its closed position, the upper edge thereof restricts pivotal movement of the pivotal closure lid 17 due to contacting with the lower edge of the arms. When the sliding closure member 24 is shifted to the rearmost position, the pivotal closure lid 17 becomes free from this restriction and is free to pivot about its pivot.

After the magnetic tape cassette is set in the cassette holder 40, the pivotable arms 60 and 61 pivot to shift the cassette holder from the position of FIG. 7 to the position of FIG. 9. During this downward movement of the cassette holder, an actuation pin (not shown) projecting from the mechanism chassis comes into contact with the lower edge of the pivotal closure lid 17 and pushes the latter upwards. As a result, the pivotal closure lid 17 is pivoted upwards to the open position, as shown in FIG. 2.

On the other hand, when the magnetic cassette is to be ejected from the recording and reproducing apparatus, the locking engagement between the eject-lock pin 59 and the locking recess 58a of the lever 58 is released by depression of an eject button provided in the recording and reproducing apparatus. Releasing the locking engagement allows the cassette holder 40 to move upwards in accordance with the resilient force exerted on the pivotal arms 60. During this upward movement, the pivotal closure lid 17 contacts with an appropriate member to be moved back to the closed position.

At the upper position of the cassette holder 40, the magnetic tape cassette can be pulled rearward. As a result, the locking heads 31a and 31b of the locking levers 29a and 29b come into contact with the tapered front ends 49a of the projection 49. As a result, the locking heads 31a and 31b are pushed upward against the resilient force exerted by the levers 29a and 29b. At the same time, the spring force of the torsion spring 28 acts to shift the sliding closure member 24 frontward. The spring force applied to the sliding closure member 24 moves the locking heads 31a and 31b upwards to be released from engagement with the openings 32a and 32b. Therefore, the sliding closure member 24 becomes free to move frontward to its closed position automatically due to the spring force of the torsion spring 28.

At the forwardmost position, the locking heads 31a and 31b again oppose the openings 33a and 33b through the sliding closure member 24 and engage therewith. Thus, locking engagement restricting movement of the sliding closure member 24 is established.

As will be appreciated, providing the lock at the open position of the sliding closure member 24 successfully prevents accidental closure of the sliding closure member due to the spring force constantly exerted thereon by the torsion spring 28. On the other hand, providing the lock release mechanism active both upon insertion of the magnetic tape cassette and upon ejection of the cassette makes it possible to lock the sliding closure member in its open position.

A cassette holder similar to the foregoing preferred embodiment, but lacking the release mechanism for locking of the sliding closure member has been disclosed in U.S. Pat. No. 3,950,787, issued on Apr. 13, 1976 to Motohiko HOSAKA, and assigned to the assignee of the present invention. The cassette receiving operation and up-and-down motion of the cassette holder have been described in detail in the disclosure. The operation of that prior cassette holder may be adapted for use in the preferred embodiment of the cassette holder according to the invention. Therefore, the contents of the aforementioned U.S. Pat. No. 3,950,787 are hereby incorporated by reference for the sake of disclosure.

As will be appreciated herefrom, according to the shown embodiment, the locking engagement for the sliding closure member 24 at both of the closed and open position thereof is established at a location adjacent both of the lateral ends of the magnetic tape cassette. By providing locking members adjacent both lateral sides, the sliding closure member can be steadily held in the closed position for firmly closing the bottom spacing.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, although the specific form of the locking lever has been disclosed hereabove in order to fully disclose a preferred embodiment of the invention, the form of the locking lever as well as the shape of the locking head can be modified in various fashion. For example, the locking levers and locking heads disclosed in the foregoing European Patent First Publication No. 01 60 822 and British Patent First Publication No. 2,155,905 can be replacements for the disclosed locking levers and the locking heads. Also, the specific construction of the cassette holder as illustrated hereabove can be replaced by various constructions of cassette holders. For example, the cassette holder as briefly disclosed in the aforementioned European Patent First Publication No. 01 60 822 will be utilized for handling the magnetic tape cassette of the present invention.

What is claimed is:

1. A magnetic tape cassette comprising:
   a cassette casing having a mouth through which a magnetic tape is accessible, said mouth including a first opening in a front end face of said casing and a second opening in a lower section of the casing adjacent said front end face;
   a pivotal closure lid covering and exposing said first opening of said mouth;
   a sliding closure member slidable with respect to the lower section of said cassette casing and adapted to cover and expose said second opening of said mouth, said closure member being movable between a first position in which it covers said second opening and a second position in which it exposes said second opening; and
   first and second resilient locking means provided with said cassette casing, each of said locking means having a resiliently deformable lever with a locking head, said first locking means being located adjacent a longitudinal front end and adjacent one of the lateral sides of said magnetic tape cassette, and said second locking means being located adjacent the front end and adjacent the other lateral side of said magnetic tape cassette, said locking lever being associated with said sliding closure member for normally holding said closure member in said first position while said cassette is not in use, and allowing said closure member to move to said second position when said cassette is inserted into an associated recording and/or reproducing apparatus.

2. The magnetic tape cassette as set forth in claim 1, wherein said closure member is provided with first and second means engagingly receiving said locking head of said locking lever at said first and second positions of said closure.

3. The magnetic tape cassette as set forth in claim 2, wehrein said closure member is formed with a pair of first and second grooves longitudinally extending in substantially parallel relationship to each other, into each of which said locking head protrudes through one of said first and second locking head receiving means.

4. The magnetic tape cassette as set forth in claim 2, wherein said first and second receiving means are vacancies defined in said closure member for allowing said locking head to pass therethrough.

5. The magnetic tape cassette as set forth in claim 4, wherein said first receiving means comprises a pair of first and second through openings formed through said sliding closure member and arranged in alignment in parallel to the longitudinal axis of said magnetic tape cassette, said first through opening being engageable with a corresponding locking head of said locking lever of said first locking means at said first position of said sliding closure member and said second through opening being engageable to said corresponding locking head of said locking lever of said first locking means at said second position of said sliding closure member.

6. The magnetic tape cassette as set forth in claim 4, wherein said second receiving means comprises a pair of third and fourth through openings formed through said sliding closure member and arranged in alignment in parallel to the longitudinal axis of said magnetic tape cassette, said third through opening being engageable to one locking head of said locking lever of said second locking means at said first position of said sliding closure member and said fourth through opening being engageable to said one locking head of said locking lever of said second locking means at said second position of said sliding closure member.

7. The magnetic tape cassette as set forth in claim 5, wherein said second receiving means comprises a pair of third and fourth through openings formed through said sliding closure member and arranged in alignment in parallel to the longitudnal axis of said magnetic tape cassette, said third through opening being engageable to a locking head of said locking lever of said second locking means at said first position of said sliding closure member and said fourth through opening being engageable to one of said locking head of said locking lever of said second locking means at said second position of said sliding closure member.

8. The magnetic tape cassette as set forth in claim 5, wherein said first groove is located at a position corresponding to said first receiving means so that the lower ends of said first and second through openings open thereto.

9. The magnetic tape cassette as set forth in claim 6, wherein said second groove is located at a position corresponding to said second receiving means so that the lower ends of said third and fourth through openings open thereto.

10. The magnetic tape cassette as set forth in claim 6, wehrein said first and second locking means are provided in said magnetic tape cassette in substantially symmetrical position with respect to the longitudinal axis of said magnetic tape cassette.

11. The magnetic tape cassette as set forth in claim 3, wherein the depth of said first and second grooves at least matches the corresponding dimension of said locking head protruding from said closure member.

12. A magnetic tape cassette comprising:
    a cassette casing having a mouth through which a magnetic tape is accessible, said mouth including a first opening in a front end face of said casing and a second opening in a lower section of the casing adjacent said front end face, and a pair of reel shaft apertures through which driving hubs of tape reels are accessible;
    a pivotal closure lid for covering and exposing said first opening of said mouth;
    a sliding closure member freely slideable in the front-to-rear direction between first and second sliding positions, said reel shaft apertures and said second opening being exposed in said first sliding position and said reef shaft apertures and said second opening being covered by said closure member in said second sliding position, said sliding closure member cooperating with said pivotal closure lid in said second sliding position in such a manner that said closure member prevents said pivotal closure lid from exposing said first opening, and said sliding closure member being formed with a plurality pairs of voids, each pair of voids being arranged in alignment on a line substantially in parallel to the lognitudinal axis of said magnetic tape cassette; and a plurality of resilient locking levers with locking heads provided in said cassette casing and respectively having heads engageable corresponding one of said voids for holding said sliding closure member at one of said first and second sliding positions, each of said locking levers being located at a position corresponding one set of said voids to engage said locking head thereof to one of the voids of the corresponding pair according to the sliding closure position.

13. The magnetic tape cassette as set forth in claim 12, wherein each pair includes first and second voids to which said locking head of the corresponding locking lever engages, said locking head engaging said first void for holding said sliding closure member at said first sliding position while said cassette is not in use, and allowing to said second void for holding said closure member at said second position when said cassette is inserted into an associated recording and/or reproducing apparatus.

14. The magnetic tape cassette as set forth in claim 13, wherein said closure member is formed with a plurality of grooves at the positions respectively corresponding to the positions of the corresponding pair of voids, which grooves receive said locking head of the corresponding locking lever passing through one of said voids.

15. The magnetic tape cassette as set forth in claim 14, which further comprises a guide means associated with said casing and said closure member for guiding sliding movement of said closure member between said first and second positions.

16. The magnetic tape cassette as set forth in claim 15, wherein said guide means comprises a guide groove formed in one of said casing and said shuitter member and a projection protruding from the other of said cassette casing and said closure.

* * * * *